US008741495B2

(12) United States Patent
Watanabe et al.

(10) Patent No.: US 8,741,495 B2
(45) Date of Patent: Jun. 3, 2014

(54) SOLID OXIDE FUEL CELL DEVICE

(75) Inventors: Naoki Watanabe, Kitakyushu (JP);
Yousuke Akagi, Kitakyushi (JP);
Shuichiro Saigan, Kitakyushu (JP);
Nobuo Isaka, Kitakyushu (JP);
Toshiharu Ooe, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 421 days.

(21) Appl. No.: 12/788,997

(22) Filed: May 27, 2010

(65) Prior Publication Data
US 2010/0304246 A1 Dec. 2, 2010

(30) Foreign Application Priority Data

May 28, 2009 (JP) .................... 2009-129050
May 19, 2010 (JP) .................... 2010-114967

(51) Int. Cl.
*H01M 8/04* (2006.01)
(52) U.S. Cl.
USPC ............................. 429/423; 429/428
(58) Field of Classification Search
USPC .................... 429/423, 416, 417, 427, 428
See application file for complete search history.

(56) References Cited

U.S. PATENT DOCUMENTS

| 2003/0180583 A1* | 9/2003 | Ichikawa et al. ............ 429/9 |
| 2005/0129997 A1* | 6/2005 | Maenishi et al. ............ 429/20 |
| 2008/0081230 A1 | 4/2008 | Takahashi et al. |
| 2009/0117426 A1* | 5/2009 | Harada et al. ............ 429/20 |
| 2012/0077101 A1 | 3/2012 | Harada et al. |

FOREIGN PATENT DOCUMENTS

| CA | 2689674 A1 | 12/2008 |
| CA | 2697652 A1 | 3/2009 |
| CN | 101116212 A | 1/2008 |
| EP | 1840997 A1 | 10/2007 |
| EP | 2173000 A1 | 4/2010 |
| GB | 2439653 A | 1/2008 |
| JP | 2007-103194 A | 4/2007 |
| JP | 2009-032555 A | 2/2009 |
| WO | WO 2009/028427 A1 | 3/2009 |

OTHER PUBLICATIONS

Extended European Search Report for European Application No. 10164039.9, dated Sep. 8, 2010, 5 pages.

* cited by examiner

*Primary Examiner* — Mark F Huff
*Assistant Examiner* — Monique Wills
(74) *Attorney, Agent, or Firm* — Brinks Gilson & Lione

(57) ABSTRACT

To provide a solid oxide fuel cell device capable of smooth transition from a startup state to an electrical generating state. The present invention is a solid oxide fuel cell device (1) for generating electricity, having a fuel cell module (2); a reformer (20) for reforming fuel, heated by the combustion of remaining fuel not used in the generation of electricity; a fuel supply means (38); a water supply means (28); an electrical generation oxidant gas supply means (45); and a control means (110) for controlling the fuel supply means and water supply means at the time of startup when the solid oxide fuel cell units are raised to a temperature at which electrical generation is possible; wherein the control means controls the fuel supply means during the SR operation such that electrical generation is started after reducing the fuel supply flow rate prior to starting electrical generation.

10 Claims, 12 Drawing Sheets

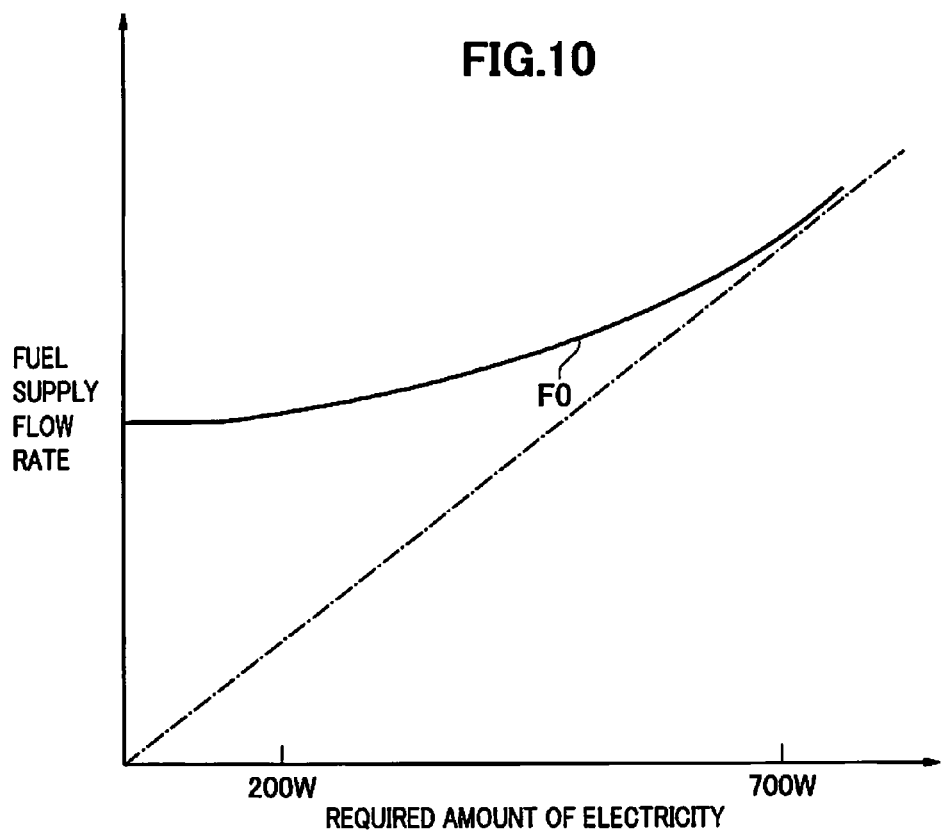
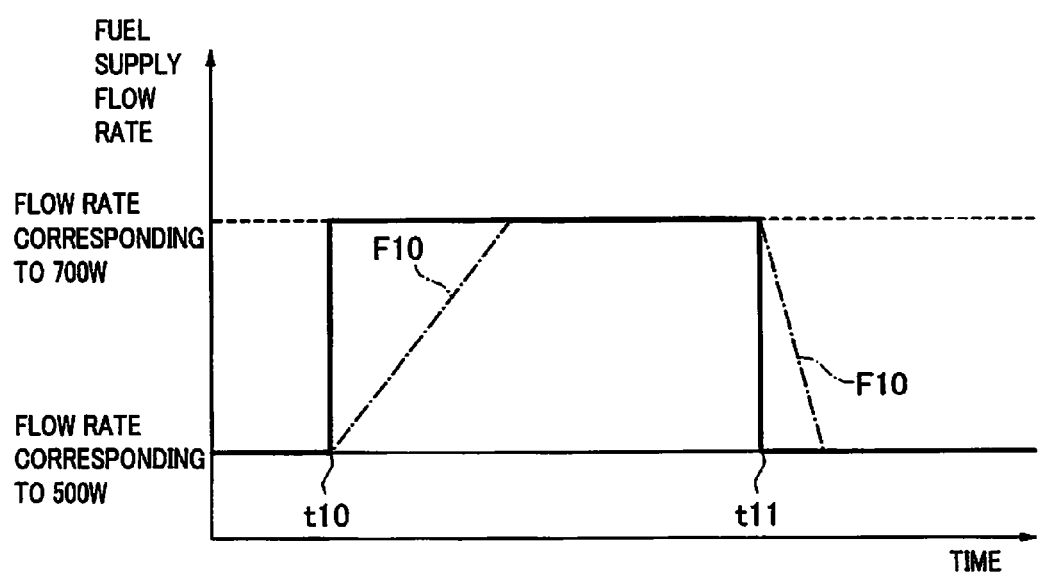

FIG.12

| REQUIRED AMOUNT OF ELECTRICITY | FUEL SUPPLY FLOW RATE L/min | GENERATING AIR SUPPLY FLOW RATE L/min | WATER FLOW RATE cc/min |
|---|---|---|---|
| 700W | 2.8 | 48 | 5.9 |
| 450W | 2.2 | 33 | 5.4 |
| 200W | 1.7 | 25 | 3.9 |

FIG.13

| MODE | STATE | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION(°C) | | |
|---|---|---|---|---|---|---|---|---|
| | | | | | | REFORMER | STACK | EVAPORATING SECTION |
| STARTUP MODE | COMBUSTION OPERATION | 6.0 | 10.0 | 100.0 | 0.0 | 300°C OR ABOVE | - | - |
| | POX1 | 6.0 | 10.0 | 100.0 | 0.0 | 350°C OR ABOVE | - | - |
| | POX2 | 5.0 | 18.0 | 100.0 | 0.0 | 600°C OR ABOVE | 250°C OR ABOVE | - |
| | ATR1 | 5.0 | 8.0 | 100.0 | 2.0 | 600°C OR ABOVE | 400°C OR ABOVE | 100°C OR ABOVE |
| | ATR2 | 4.0 | 4.0 | 100.0 | 3.0 | 650°C OR ABOVE | 600°C OR ABOVE | 100°C OR ABOVE |
| | SR1 | 3.0 | 0.0 | 100.0 | 8.0 | 650°C OR ABOVE | 700°C OR ABOVE | 100°C OR ABOVE |
| | SR2 | 2.3 | 0.0 | 80.0 | 6.3 | 650°C OR ABOVE | 700°C OR ABOVE | 100°C OR ABOVE |

# SOLID OXIDE FUEL CELL DEVICE

RELATED APPLICATIONS

This application claims priority under 35 U.S.C. §119 to Japanese Patent Application Nos. 2009-129050 filed on May 28, 2009 and 2010-114967 filed on May 19, 2010, the entire contents of which are hereby incorporated by reference.

BACKGROUND OF THE INVENTION

1. Technical Field

The present invention relates to a solid oxide fuel cell device, and more particularly to a solid oxide fuel cell device for generating electricity by reacting fuel with an electrical generation oxidant gas.

2. Background Art

Solid oxide fuel cells ("SOFCs" below) operate at relatively high temperatures, using an oxide ion-conducting solid electrolyte as an electrolyte, with electrodes placed on each side thereof, and with fuel gas supplied to one side thereof and oxidizer (air, oxygen, or the like) supplied to the other side thereof.

In such SOFCs, steam or carbon dioxide is produced by the reaction between oxygen ions passed through the oxide ion-conducting solid electrolyte and fuel, thereby generating electrical and thermal energy. The electrical energy is removed to outside the SOFC, where it is used for various electrical purposes. The thermal energy is transferred to the fuel, the SOFC, the oxidizer, and the like, and is used to raise the temperature thereof.

Japanese Patent Unexamined Publication No. 2007-103194 (JP2007-103194A) sets forth a power supply furnished with a solid oxide fuel cell device. In the fuel cell device set forth therein, fuel and air are combusted in a combustion chamber after contributing to the generation of electricity, and that heat of combustion is used to heat the cell stack.

Japanese Patent Unexamined Publication No. 2009-32555 (JP2009-32555A) sets forth a fuel cell device. In this fuel cell device, a fuel gas supplying reformer and fuel cells are raised to a predetermined temperature in a startup stage. In this startup stage, switching off between a partial oxidation reforming process (POX), an auto thermal process (ATR), and a steam reforming process (SR) occurs as the temperature rises within the reformer, thereby reforming the fuel.

Furthermore, in the fuel cell device set forth in JP2009-32555A, control is executed so that electrical generation by the cell stack is begun when the cell stack temperature reaches a temperature at which electrical generation can be started, and electricity is generated while a predetermined flow rate of fuel gas supplied to the reformer and oxygen-containing gas supplied to the cell stack continue to be supplied during an interval between surpassing the temperature at which electrical generation can start and the elapse of a predetermined time. Sufficient electricity is thus obtained when the load-following operation is started following the end of the continuous supply of a predetermined flow rate.

SUMMARY OF THE INVENTION

However, even in solid oxide fuel cell device which perform startup in the way described in JP2009-32555A, the problem occurs that when a load-following operation is begun after generating electricity by continuously supplying a predetermined flow rate of fuel and oxidant gas, operation of the solid fuel cell device becomes unstable. In other words, when transitioning from the startup state to the normal generating state, the fuel cell device operation has a tendency to become unstable. In particular, in the type of fuel cell device wherein the amount of electricity generated is changed in a way which follows the load, for example when the required electrical power is small at the time of the load-following operation startup, the flow rate of fuel supplied suddenly drops when the load-following operation starts. For this reason, the amount of fuel combusted in order to heat the reformer is reduced, and because the steam reforming reaction which occurs inside the reformer is an endothermic reaction, the temperature of the reformer and the cell stack may suddenly drop so that normal electricity generation cannot be carried out. In particular, when the cell stack temperature drops upon the start of electrical generation, a long period of time is required to recover the temperature at which electricity can be generated, creating the problem that normal electrical generation cannot take place over that long period of time.

The present invention therefore has the object of providing a solid oxide fuel cell device capable of smoothly transitioning from the startup state to the electrical generating state.

In order to resolve the above-described problems, the present invention is a solid oxide fuel cell device for generating electricity by reacting fuel and electrical generation oxidant gas, comprising: a fuel cell module furnished with multiple solid oxide fuel cell units; a fuel supply device for supplying fuel used to generate electricity; a reformer for reforming fuel supplied from the fuel supply device and supplying the reformed fuel to the solid oxide fuel cell units, disposed above the solid oxide fuel cell units so as to be heated when fuel not used to generate electricity in the solid oxide fuel cell units is combusted at the top end of the solid oxide fuel cell units; a water supply device for supplying water to the reformer; an electrical generation oxidant gas supply device for supplying oxidant gas for electrical generation to the solid oxide fuel cell units; and a controller for controlling the fuel supply device and the water supply device during startup procedure wherein the solid oxide fuel cell units in the fuel cell module are raised to a temperature at which electricity can be generated, carrying out within the reformer the SR operation, which consists of only the steam reforming reaction, then starting the generation of electricity; wherein the controller controls the fuel supply device to reduce the fuel supply flow rate during the SR operation prior to the start of electrical generation, then starts the generation of electricity.

In the present invention thus constituted, the controller controls the fuel supply device, the water supply device, and the electrical generation oxidant gas supply device, supplying fuel and water to the reformer, and supplying electrical generation oxidant gas to the solid oxide fuel cell. Remaining fuel not used to generate electricity in the solid oxide fuel cell units is combusted and used to heat the reformer. During startup procedure, wherein the solid oxide fuel cell is raised to a temperature at which electricity can be generated, the controller carries out an SR operation in which only the steam reforming reaction takes place. Here, electrical generation is started after the fuel supply flow rate during the SR operation is reduced prior to beginning electrical generation.

In order to raise the temperature of the fuel cell module and the reformer to a temperature at which electricity can be generated, the fuel supply flow rate during the SR operation in the startup procedure is generally set to be greater than the fuel supply flow rate when electricity is generated. Therefore when a transition occurs from the SR operation during the startup procedure to electrical generation, the fuel supply flow rate is suddenly reduced to the flow rate required for electrical generation, therefore the heat of combustion heating the fuel cell module or the reformer is also reduced. In addition, during the SR operation no electricity is generated, therefore all of the fuel supply to the solid oxide fuel cell units is combusted; the reformer is heated by that heat of combustion, but when electrical generation starts, fuel is also consumed for generating electricity, therefore the combusted fuel is reduced by more than the amount of reduction in the fuel supply flow rate, such that the heat of combustion is even further reduced.

Also, because there are multiple solid oxide fuel cell units, variations arise in the flow rate of fuel supplied to each of the cell units immediately after a change in the fuel supply flow rate. Moreover, an endothermic steam reforming reaction is carried out inside the reformer disposed at the top end of the cell units. Therefore since there are variations in the flow rate of fuel supply between each of the cell units, there is greater heat absorption by the reformer than the heat of combustion resulting from the combustion of fuel in the vicinity of those cell units where there has been a large reduction in the flow rate of fuel supply relative to other cells; the fuel cell module temperature and reformer temperature drop, and the problem arises of temperature variations between each of the solid oxide fuel cell units. If electrical generation is started in a state in which such temperature variations exist, excessive load may fall on those cells which are at a low temperature or for which the flow rate of fuel supplied is below that needed to generate electricity, leading to cell breakage or other problems.

In the present invention, electrical generation is started after the fuel supply flow rate during the SR operation in the startup procedure is reduced prior to generating electricity, therefore the reduction in the fuel supply flow rate at the time of generation startup can be made gradual and temperature variations between solid oxide fuel cell units can be reduced, thereby preventing excessive load on each of the individual solid oxide fuel cell units, such that the lifespan of the solid oxide fuel cell units can be extended. Moreover, in the present invention the fuel supply flow rate during the SR operation is reduced prior to the startup of electrical generation, therefore temperature variations resulting from sudden changes in the fuel supply flow rate at the time of generation startup can be ameliorated, and breakage due to large temperature reductions or fuel insufficiencies in a portion of the solid oxide fuel cell units can be prevented. Furthermore, in the present invention the reduction in fuel supply flow rate at the time of transition from the SR operation to electrical generation occurs gradually, therefore the temperature of the solid oxide fuel cell units can be prevented from suddenly dropping until the temperature rise effect from Joule heat caused by the flow of electrical current in the solid oxide fuel cell units is manifested after the startup of electrical generation.

In the present invention, the controller preferably controls the water supply device so that electrical generation is started after the water supply flow rate is reduced during the SR operation and prior to the startup of electrical generation.

In the present invention thus constituted, electrical generation is started after the water supply flow rate during the SR operation is reduced prior to generating electricity, therefore an excessive rise in the amount of water relative to fuel associated with the reduction in the fuel supply flow rate prior to generating electricity can be prevented. If water is excessive, fuel containing that excessive water in the reformer will be combusted, leading to unstable combustion and a risk that sufficient heating of the reformer will not be accomplished and the reformer temperature will drop. If fuel containing excessive water is supplied to the solid oxide fuel cell units, the fuel electrode in the cell units may oxidize, posing the risk of shortening the life span of the cell units. In the present invention thus constituted, these problems can be avoided.

In the present invention the controller preferably controls the electrical generation oxidant gas supply device so that electrical generation is started after the electrical generation oxidant gas supply flow rate is reduced during the SR operation and prior to the startup of electrical generation.

In general, the solid oxide fuel cell units temperature is low and fuel combustion is unstable at the time of startup, therefore carbon monoxide may easily be produced due to incomplete combustion, and increasing the supply of oxidant gas dilutes carbon monoxide. On the other hand, less oxidant gas in an appropriate amount is supplied for generating electricity at the beginning of generation due to the rising temperature. However, if the oxidant gas supply flow rate is suddenly reduced at the start of electrical generation, airflow inside the fuel cell module may become turbulent, leading to unstable fuel combustion. In particular, because the fuel supply flow rate is reduced following the startup of electrical generation, the combustion flame is small, making combustion even more unstable. In the present invention thus constituted, electrical generation starts after the oxidant gas supply flow rate during the SR operation is reduced prior to starting the generation of electricity, therefore a sudden reduction in the oxidant gas supply flow rate at the beginning of electrical generation, and the associated destabilization of combustion, can be prevented.

In the present invention the fuel cell module is preferably constituted to output variable electrical power in a predetermined output power range, and the controller controls the fuel supply device so that the fuel supply flow rate reduced prior to startup of electrical generation during the SR operation is more than the fuel supply flow rate corresponding to the minimum output power.

During the SR operation, it may occur that the fuel cell module temperature does not rise sufficiently, or that temperature variations occur, therefore if the fuel supply flow rate is suddenly reduced when electrical generation starts, heat absorption caused by the steam reforming reaction in the reformer may be greater than the amount of heat emitted, leading to the risk of a drop in the temperature of the reformer or the solid oxide fuel cell units; once those temperatures have dropped, a long period of time is required to recover the temperature. In the present invention thus constituted, the reduced fuel supply flow rate in the SR operation prior to the start of generation is greater than the fuel supply flow rate for minimum output power, therefore a temperature reduction caused by an over-reduction of the fuel supply flow rate can be prevented.

In the present invention the controller preferably controls the fuel supply device so that the fuel supply flow rate reduced prior to startup of electrical generation during the SR operation is fixed at a predetermined value which is greater than the fuel supply flow rate corresponding to the minimum output power.

In the present invention thus constituted, the reduced fuel supply flow rate in the SR operation prior to the start electrical generation is fixed at a value less than the fuel supply flow rate at the SR startup and greater than the fuel supply flow rate at minimum output power, therefore fuel waste prior to the start of electrical generation can be suppressed, and over-reduction of the solid oxide fuel cell units temperature can be prevented. Moreover, because the fuel supply flow rate is fixed immediately prior to the start of electrical generation, airflow inside the fuel cell module can be stabilized during the SR operation, and airflow turbulence at the time of electrical generation is started can be suppressed.

In the present invention, the controller preferably controls the fuel supply device so that the fuel supply flow rate reduced prior to startup of electrical generation during the SR operation is fixed at a predetermined value which is greater than the fuel supply flow rate corresponding to an intermediate value in the output power range.

In the present invention thus constituted, the reduced fuel supply flow rate in the SR operation prior to starting electrical generation is fixed at a predetermined value which is greater than the fuel supply flow rate corresponding to an intermediate value of the output power range, therefore the range of change in the fuel supply flow rate at the time of electrical generation is starting can be reduced. It is also fixed at a value which is greater than the fuel supply flow rate corresponding to an intermediate value, therefore over-reduction of the fuel cell module temperature can be prevented. Moreover, the fuel supply flow rate is fixed immediately prior to the start of electrical generation, therefore the operating state at the time electrical generation is begun can be stabilized.

In the present invention the controller preferably controls the fuel supply device so that the fuel supply flow rate reduced prior to startup of electrical generation during the SR operation is fixed at a value corresponding to approximately the maximum value in the output power range.

In the present invention thus constituted, the reduced fuel supply flow rate during the SR operation prior to starting electrical generation is fixed at a value corresponding to an approximately maximum value of the output power range, therefore the range of change in the fuel supply flow rate during the SR operation can be reduced, and unanticipated drops in the fuel cell temperature caused by over-reduction of the fuel supply flow rate can be prevented. Also, in the present invention thus constituted, a smooth transition to the electrical generating state can be achieved no matter what electric power within the output power range is required at the startup of electrical generation. Moreover, the fuel supply flow rate is fixed immediately prior to the start of electrical generation, therefore the operating state at the startup of electrical generation can be stabilized.

In the present invention, the controller preferably controls the fuel supply device, the water supply device, and the electrical generation oxidant gas supply device so that the proportions of the fuel supply flow rate, the water supply flow rate, and the electrical generation oxidant gas supply flow rate immediately prior to the start of electrical generation are set to predetermined electrical generation standby supply proportions which are different from the proportions of the fuel supply flow rate, the water supply flow rate, and the electrical generation oxidant gas supply flow rate during electrical generation.

In general, proportions of supply flow rates at the time of electrical generation are set to predetermined proportions. In the present invention thus constituted, the predetermined supply flow rate proportions for standby electrical generation are set to be different from the supply flow rate proportions for generating electricity, therefore a smooth transition to the electrical generating state can be achieved by setting the predetermined proportions of the supply flow rates at the proportions optimized for standing by to generate electricity. Specifically, by appropriately setting the predetermined supply flow rate proportions for electrical generation standby, fuel cell module temperature drops, airflow turbulence, and unstable fuel combustion during SR operation or at the time of electrical generation start up can be prevented.

In the present invention the electrical generation standby supply proportions are preferably configured so that the proportion of the fuel supply flow rate within the entirety of the fuel supply flow rate, the water supply flow rate, and the electrical generation oxidant gas supply flow rate is smaller than the proportion of the fuel supply flow rate within the entirety of the fuel supply flow rate, the water supply flow rate, and the electrical generation oxidant gas supply flow rate when generating electricity.

In the present invention thus constituted, the proportion of fuel supply flow rate to the entirety of flow rate of supplied fuel, water, and electrical generation oxidant gas is set to be less than the proportion of fuel supply flow rate to the entirety of flow rate of supplied fuel, water, and electrical generation oxidant gas when generating electricity, therefore the range of change in the fuel supply flow rate is smallest at the startup of electrical generation, such that combustion of fuel can be prevented from becoming unstable when transitioning into electrical generation.

In the present invention, the electrical generation standby supply proportions are preferably configured so that the proportion of the electrical generation oxidant gas supply flow rate within the entirety of the fuel supply flow rate, the water supply flow rate, and the electrical generation oxidant gas supply flow rate is greater than the proportion of the electrical generation oxidant gas supply flow rate within the entirety of the fuel supply flow rate, the water supply flow rate, and the electrical generation oxidant gas supply flow rate when generating electricity.

In the present invention thus constituted, the electrical generation oxidant gas supply flow rate is not reduced very much when the fuel supply flow rate is reduced prior to the start of electrical generation during the SR operation, therefore the range of change in the quantity of gas flowing in the fuel cell module can be reduced, and airflow turbulence can be made relatively small even when the fuel supply flow rate is reduced during the SR operation.

The present invention is a solid oxide fuel cell device for generating electricity by reacting fuel and electrical generation oxidant gas, comprising: a fuel cell module furnished with multiple solid oxide fuel cell units; fuel supply means for supplying fuel used to generate electricity; a reformer for reforming fuel supplied from the fuel supply means and supplying the reformed fuel to the solid oxide fuel cell units, disposed above the solid oxide fuel cell units so as to be heated when fuel not used to generate electricity in the solid oxide fuel cell units is combusted at the top end of the solid oxide fuel cell units; water supply means for supplying water to the reformer; electrical generation oxidant gas supply means for supplying oxidant gas for electrical generation to the solid oxide fuel cell units; and control means for controlling the fuel supply means and the water supply means during startup procedure wherein the solid oxide fuel cell units in the fuel cell module are raised to a temperature at which electricity can be generated, carrying out within the reformer the SR operation, which consists of only the steam reforming reaction, then starting the generation of electricity; wherein the control means controls the fuel supply means to reduce the fuel supply flow rate during the SR operation prior to the start of electrical generation, then starts the generation of electricity.

Using the solid oxide fuel cell device of the present invention, a smooth transition can be achieved from the startup state to the electrical generating state.

BRIEF DESCRIPTION OF THE DRAWINGS

FIG. 10: A graph showing an example of the relationship between the required amount of generated electricity input to the control section and the fuel supply flow rate needed to produce the required amount of generated electricity in an embodiment of the present invention.

FIG. 11: A graph showing an example of the change over time in fuel supply flow rate relative to changes in the required amount of generated electricity in an embodiment of the present invention.

FIG. 12: A data table showing an example of the relationship between the required amount of generated electricity and the fuel supply flow rate, generating air supply flow rate, and water supply flow rate needed to produce the required amount of generated electricity.

FIG. 13: An operation table showing an example of a solid oxide fuel cell device startup procedure in an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
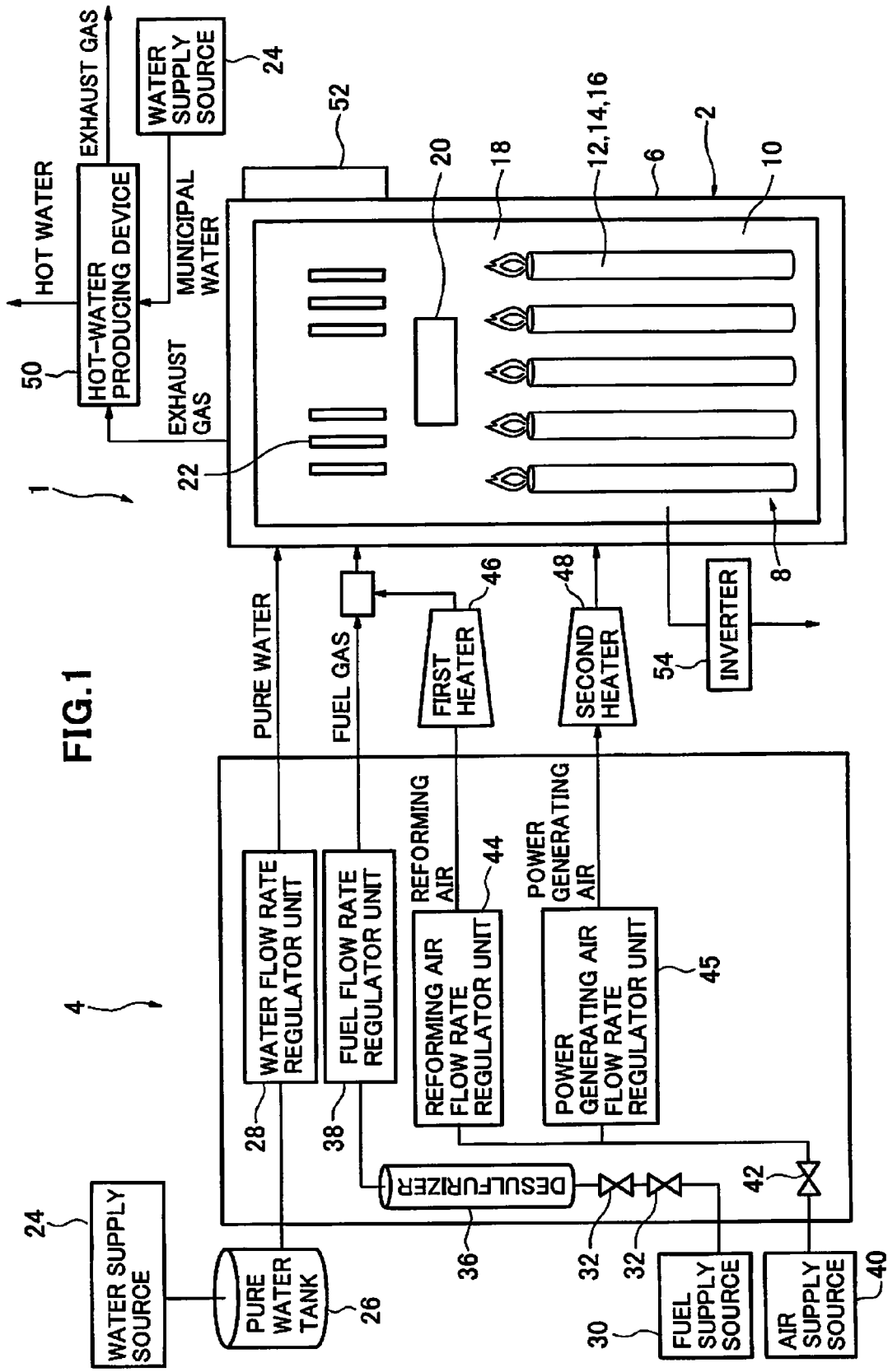
FIG. 1: An overview schematic showing a solid oxide fuel cell device (SOFC) according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
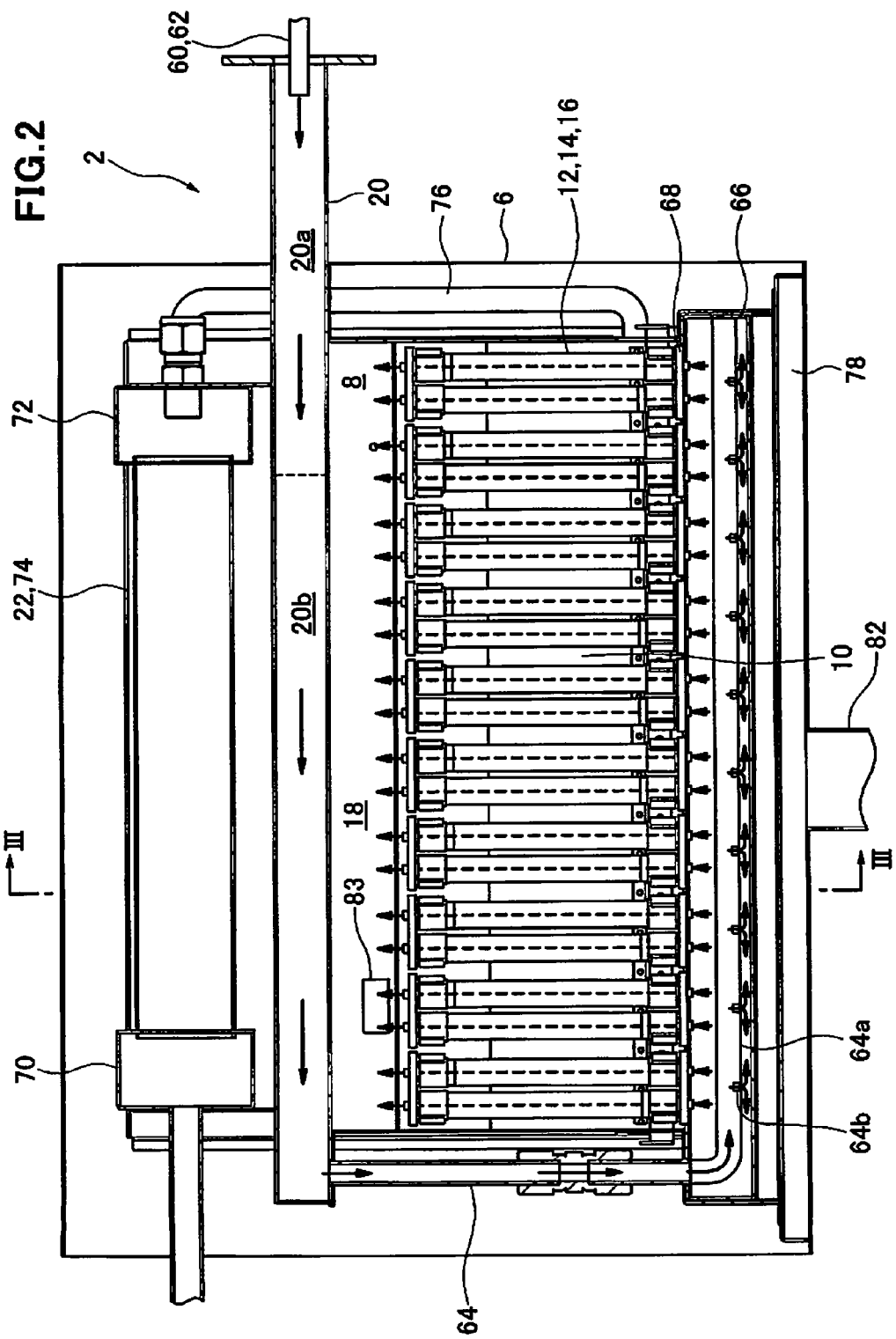
FIG. 2: A front elevation sectional diagram showing a solid oxide fuel cell device (SOFC) fuel cell module according to an embodiment of the present invention.
Figure 3:
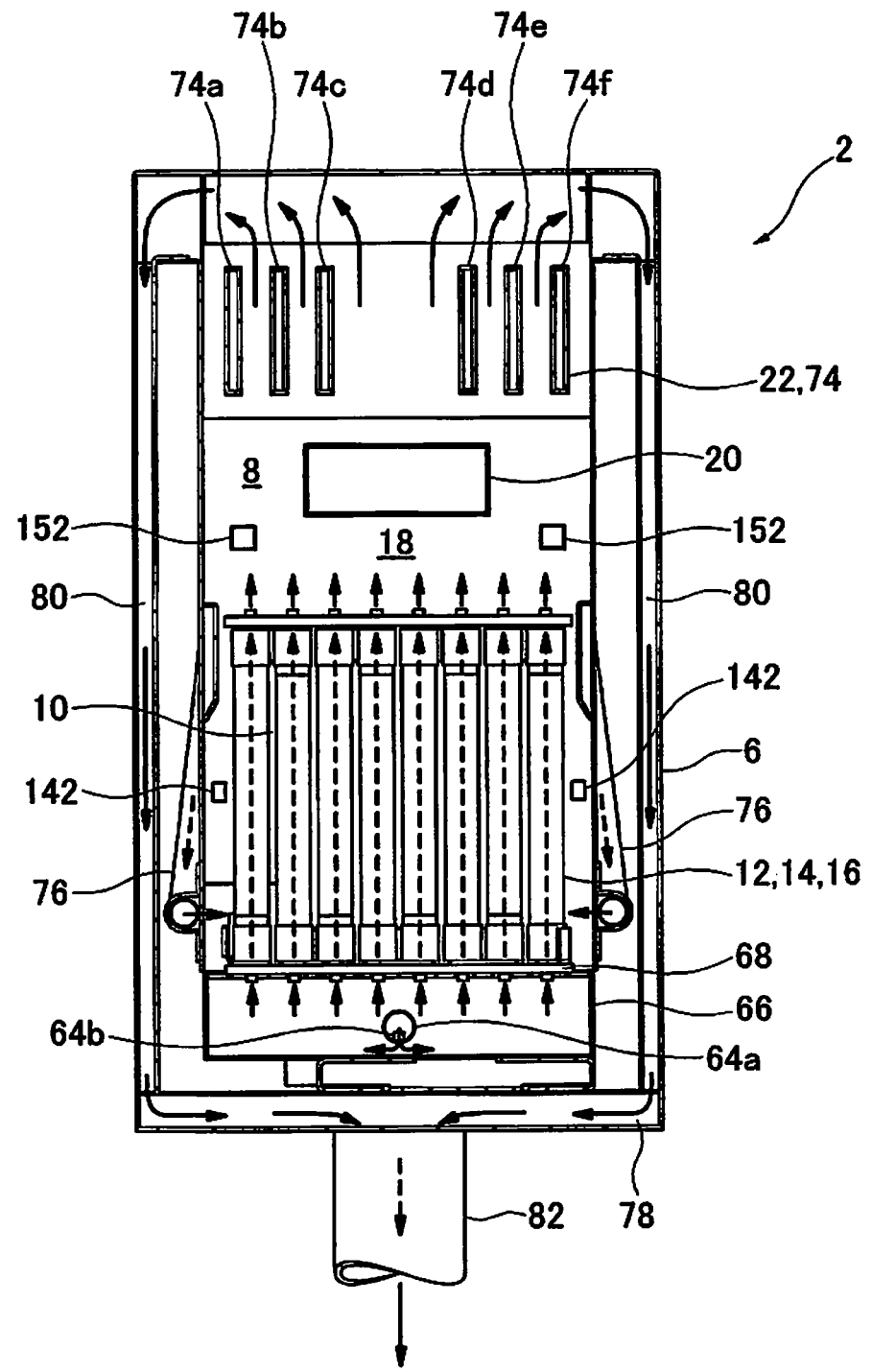
FIG. 3: A sectional diagram along line III-III in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
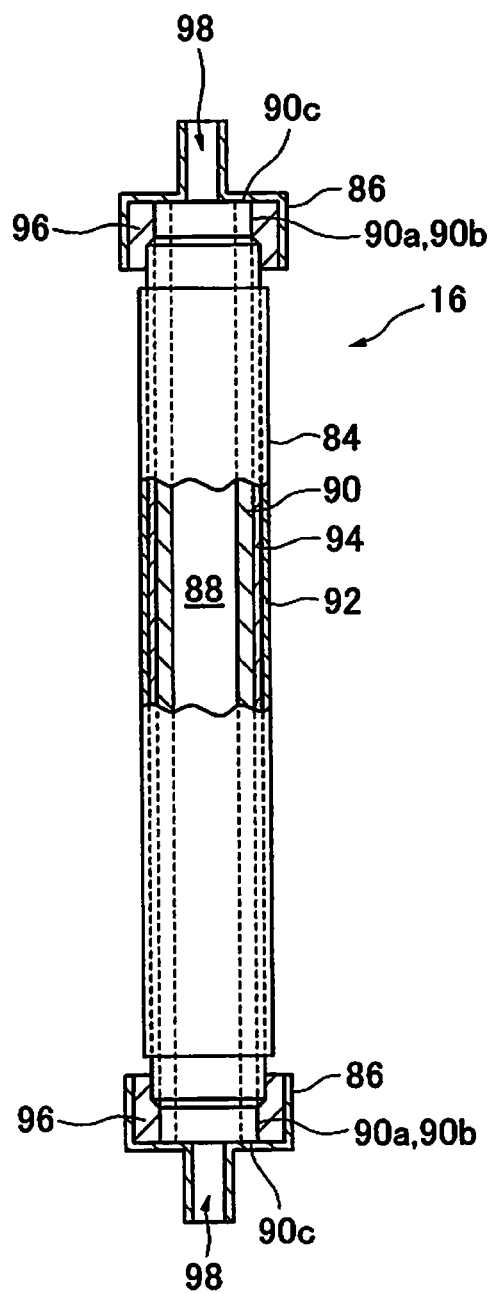
FIG. 4: A partial sectional diagram showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
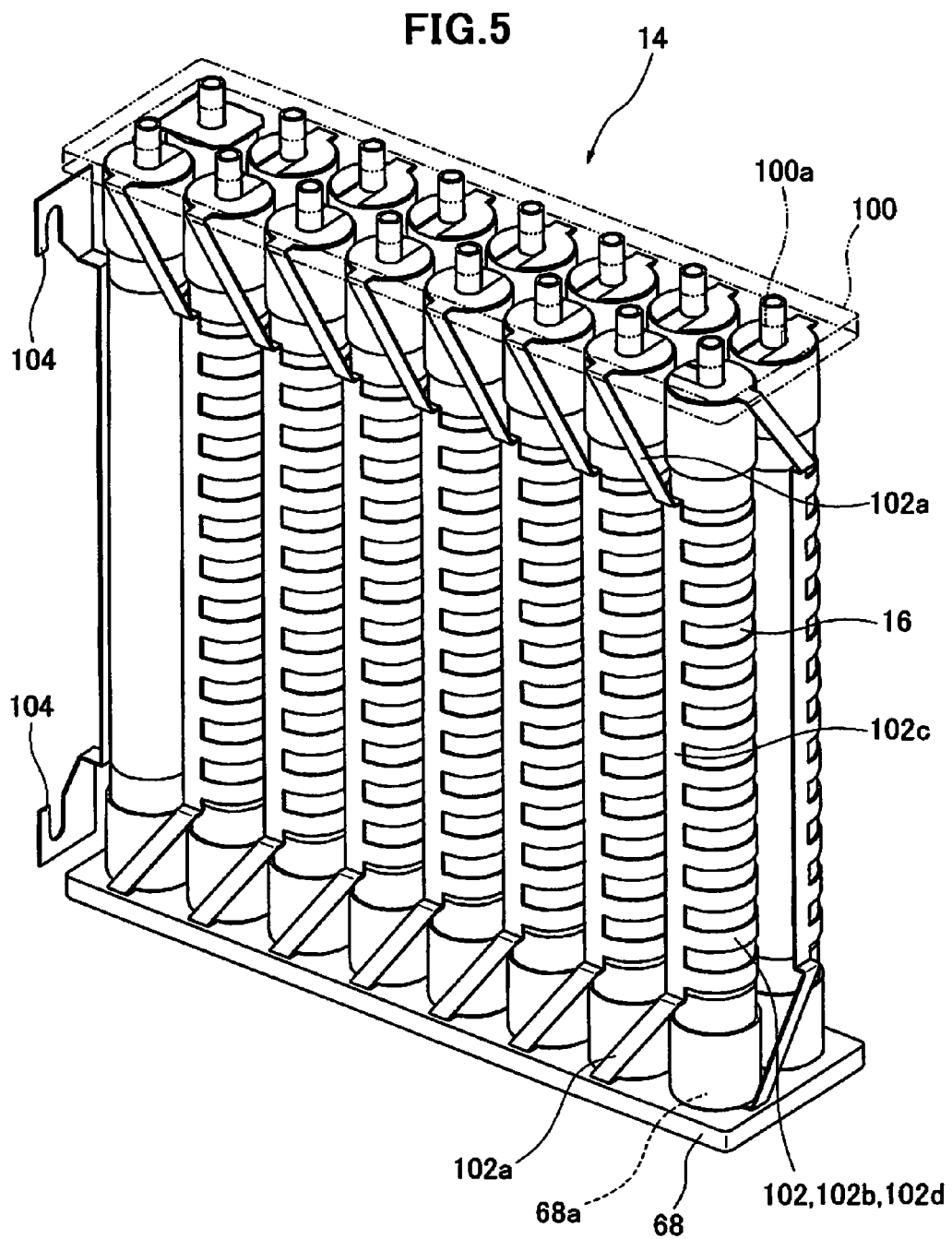
FIG. 5: A perspective diagram showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
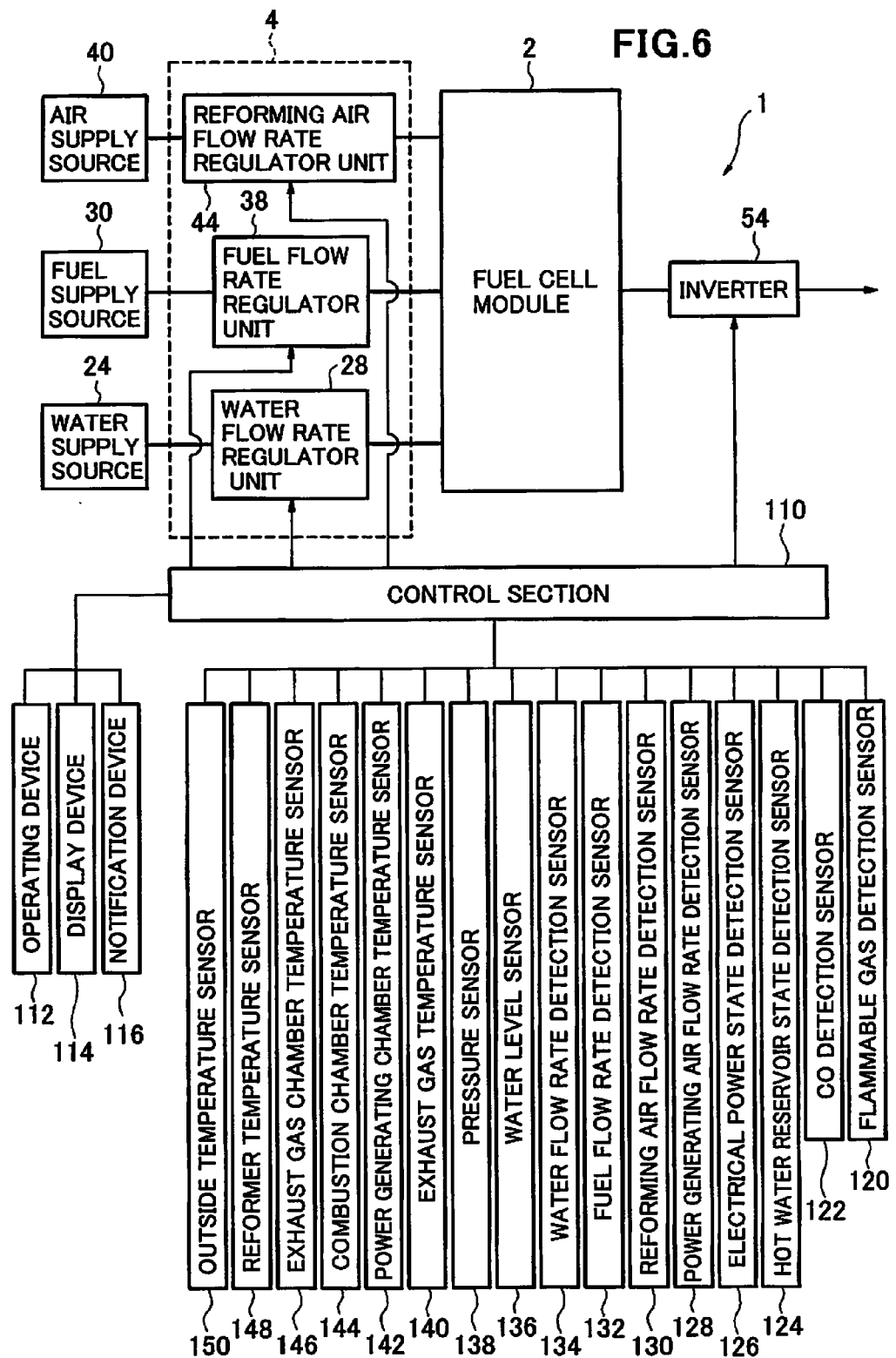
FIG. 6: A block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \tag{1}$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

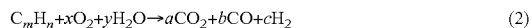

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
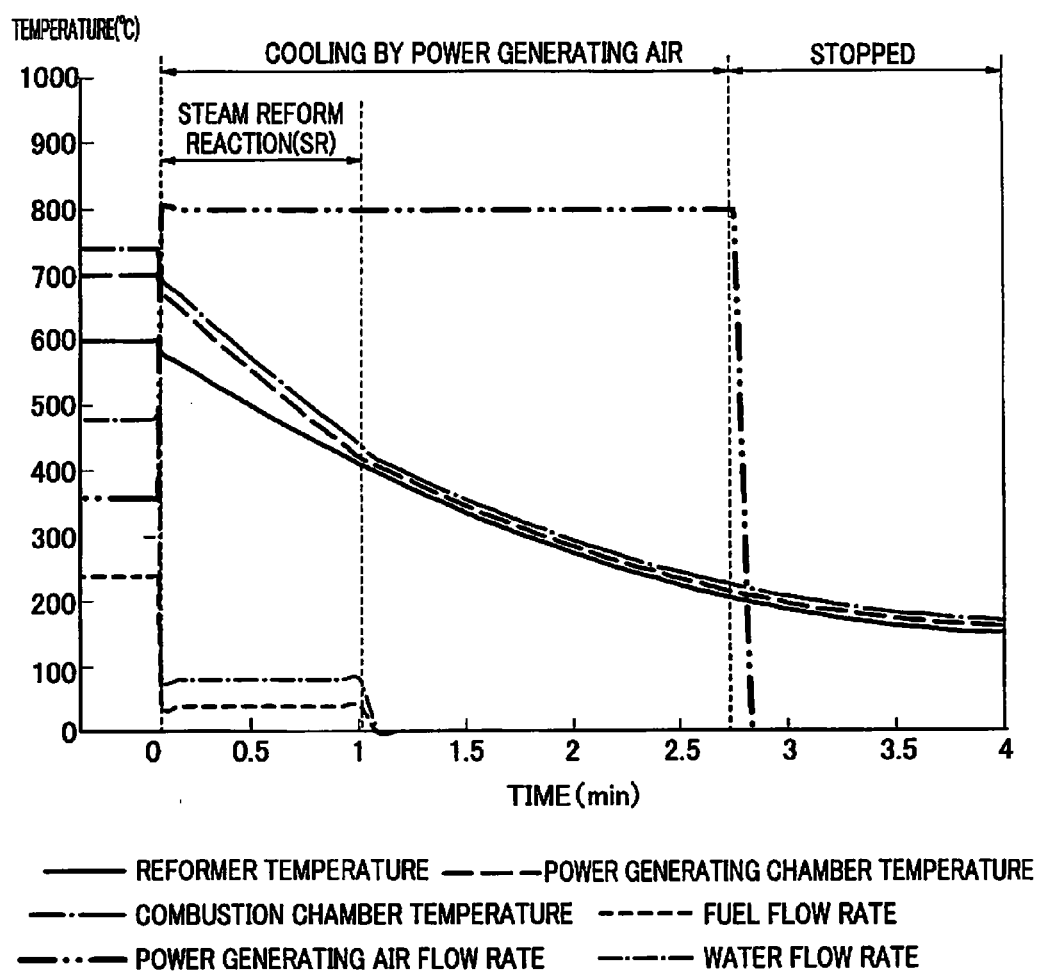
FIG. 8: A timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9 through 12, we discuss the effect of the load-following operation when generating electricity using a solid oxide fuel cell device 1 according to an embodiment of the present invention.

Figure 9:
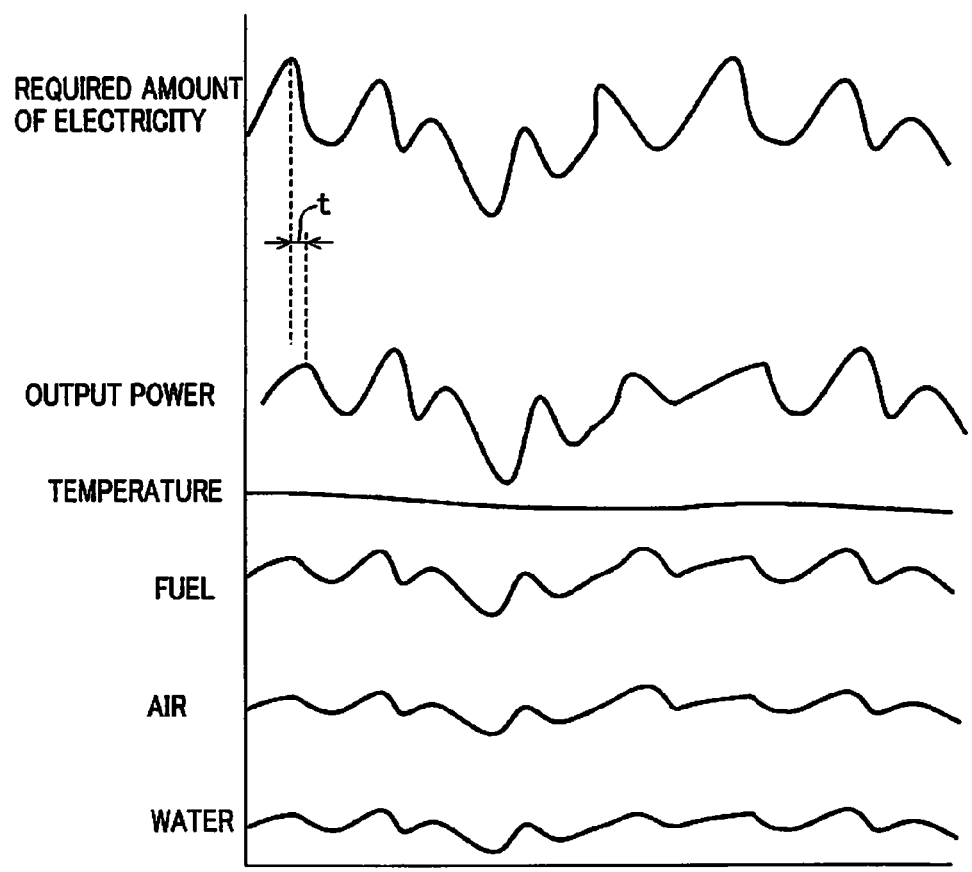
FIG. 9: A timing chart explaining the load-following operation in a solid oxide fuel cell device (SOFC) according to an embodiment of the present invention.

FIG. 9 is a timing chart explaining the load-following operation in a solid oxide fuel cell device of the embodiment. FIG. 10 is a graph showing an example of the relationship between the required amount of generated electricity input to the control section and the fuel supply flow rate needed to produce the required amount of generated electricity. FIG. 11 is a graph showing an example of the change over time in fuel supply flow rate relative to changes in the required amount of generated electricity. FIG. 12 is a data table showing an example of the relationship between the required amount of generated electricity and the fuel supply flow rate, generating air supply flow rate, and water supply flow rate needed to produce the required amount of generated electricity.

Figure 7:
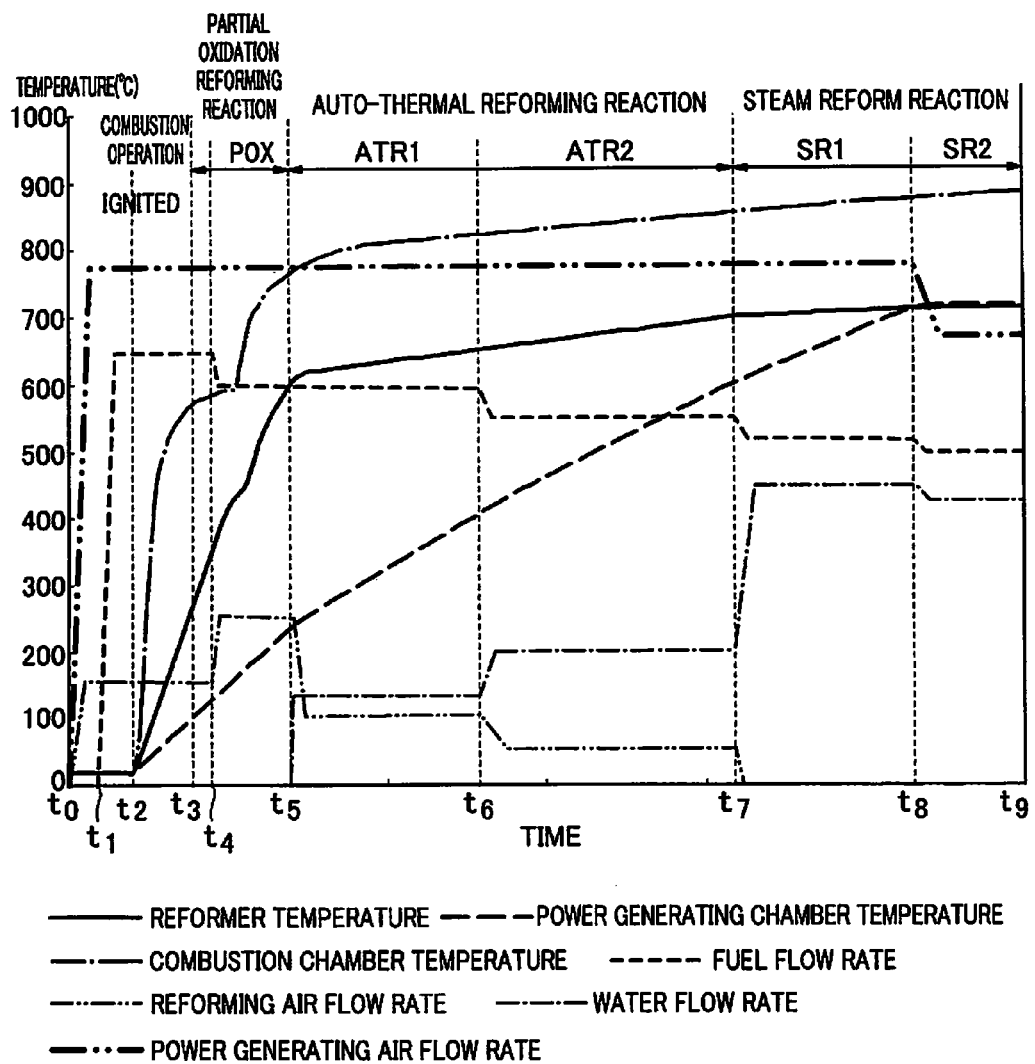
FIG. 7: A timing chart showing the operation upon startup of a solid oxide fuel cell device (SOFC) according to an embodiment of the present invention.

After the startup processing described in FIG. 7, the solid oxide fuel cell device 1 executes the load-following operation shown in FIG. 9 to obtain an output power corresponding to the required amount of generated electricity from the inverter 54 (FIG. 6). In other words, as shown in FIG. 6, the control section 110 serving as controller sends signals to the fuel flow regulator unit 38 serving as fuel supply device, the generating airflow regulator unit 45 serving as oxidant gas supply device, and the water flow regulator unit 28 serving as water supply device in response to the required amount of generated electricity from the inverter 54, thereby supplying the requisite flow rates of fuel, air, and water to the fuel cell module 2. As shown in FIG. 9, the output power of the solid oxide fuel cell device 1 thereby changes so as to follow the amount of generated electricity required from the inverter 54. Here, the output power response relative to the required amount of generated electricity is delayed by a time t; this is because the delay in output power changes due to the slowing of the change in fuel supply flow rate, etc.; there is also a delay in output power following relative to the sudden change in required electrical generation due to the major suppression of change in the fuel supply flow rate. Note that the control section 110, the fuel flow regulator unit 38, the generating airflow regulator unit 45, and the water flow regulator unit 28 respectively function as a control means, a fuel supply means, an oxidant gas supply means, and a water supply means.

The control section 110 determines the fuel supply flow rate using the graph illustrating an example in FIG. 10, in accordance with the required amount of generated electricity from the inverter 54, and controls the fuel flow regulator unit 38 so that the determined flow rate of fuel is supplied to the reformer 20 in the fuel cell module 2. The control section 110 determines a fuel supply flow rate relative to the required electrical generation according to curve F0 in FIG. 10. As shown in FIG. 10, the fuel supply flow rate is determined so as to increase monotonically with an increase in the required amount of generated electricity, however the fuel supply flow rate is essentially a fixed value at or below the required generated electricity amount of approximately 200 W.

When the required amount of generated electricity is changed, degradation of the fuel cell module 2 may be hastened due to the sudden change in fuel cell unit temperature if the fuel supply flow rate is suddenly changed, therefore as shown in FIG. 11, the fuel supply flow rate is gradually increased or gradually decreased in order to achieve slow changes. As shown in FIG. 11, the rate of change in the fuel supply flow rate when fuel is increased is set to be smaller than the rate of change in the fuel supply flow rate when fuel is reduced. In other words, if the change is slowed and the delay is made large relative to a reduction in the fuel supply flow rate, fuel is unnecessarily consumed, therefore the rate of change is set to be larger for a reduction than an increase. FIG. 11 is a graph showing an example of change in fuel supply flow rate with respect to time when the required amount of generated electricity changes in a step fashion from 500 W to 700 W. As shown in FIG. 11, at time t10 if the required amount of generated electricity is suddenly changed from 500 W to 700 W, the required fuel supply flow rate also changes from a supply flow rate corresponding to a 500 W electrical power output to a supply flow rate corresponding to 700 W. However, the control section 110 controls the fuel flow regulator unit 38 to gradually increase the fuel supply flow rate, as shown by the imaginary line F10 in FIG. 11, so as to prevent a sudden increase in the fuel supply flow rate.

Similarly, at time t11, when the required amount of generated electricity changes from 700 W to 500 W, the control section 110 gradually reduces the fuel supply flow rate following imaginary line F10 in FIG. 11, so as to avoid a sudden reduction in the fuel supply flow rate. Note that the rate of change in the fuel supply flow rate is set to be more gradual for an increase in the supply flow rate than for a reduction in the supply flow rate. As explained above, the fuel reduction side does not act in the direction of increasing the cell temperature, therefore optimization is performed to reduce wasteful fuel consumption while preventing excess temperature reduction caused by the reduction in fuel, taking note of the low sensitivity to cell degradation.

FIGS. 10 and 11 relate to fuel supply flow rate, but the generating air supply flow rate and water supply flow rate are similarly changed in response to the required amount of generated electricity. Also, as shown by the example in FIG. 12, the proportions of fuel, generating air, and water supply quantities relative to the required amounts of generating electricity are optimized to obtain an appropriate operating state, and differ depending on the amount of generate electricity required. The solid oxide fuel cell device 1 in the present embodiment is constituted to output electrical power in an output power range of 200 W to 700 W. In this output power range, the proportions of fuel, generating air, and water supply quantities during electrical generation are set so that if the fuel supply flow rate is 1, the generating air supply flow rate is approximately 14.7-17.1, and the water supply flow rate is approximately 0.0021-0.0025.

Next, referring to FIG. 13 and again to FIG. 7, we discuss details of startup processing for the solid oxide fuel cell device 1 of this embodiment of the present invention.

FIG. 13 is an operation table showing the solid oxide fuel cell device 1 startup processing procedure.

When the solid oxide fuel cell device 1 is started up at time t0 in FIG. 7, the control section 110 sends a signal to the reforming airflow regulator unit 44 serving as reforming oxidant gas supply device and to the generating airflow regulator unit 45 serving as electrical generation oxidant gas supply device, thereby starting those devices and supplying reforming air and generating air to the fuel cell module 2. In the present embodiment, when supply is started at time t0, the reforming air supply flow rate is set at 10 L/min and the generating air supply flow rate at 100 L/min (FIG. 13).

Next, at time t1, the control section 110 sends a signal to the fuel flow regulator unit 38 serving as fuel supply device, thereby starting the supply of fuel to the reformer 20. Fuel and reforming air fed into the reformer 20 are thus fed into each of the fuel cell units 16 via the reformer 20, a fuel gas supply pipe 64, and a manifold 66. Fuel and reforming air fed into each of the fuel cell units 16 flows out of the top ends of each of fuel gas flow paths 98 of the fuel cell unit 16. Note that in the present embodiment, the fuel supply flow rate is set at 6 L/min when supply is started at time t1 (the "combustion operation" state in FIG. 13).

Moreover, at time t2, the control section 110 sends a signal to the ignition device 83 and ignites fuel flowing out of the fuel cell unit 16. Fuel is thus combusted in the combustion chamber 18, so that the reformer 20 disposed there above is heated, and the temperature of the combustion chamber 18, the electrical generating chamber 10 and the fuel cell stack 14 disposed within the chamber 10 also rises (times t2-t3 in FIG. 7). When the temperature of the reformer 20 reaches about 300° C. as a result of this heating of the reformer, a partial oxidation reform reaction (POX) occurs within the reformer 20 (time t3 in FIG. 7). Because the partial oxidation reform reaction is an exothermic reaction, the reformer 20 is heated by the heat of reaction arising from the occurrence of the partial oxidation reform reaction.

When the temperature further rises and the temperature of the reformer 20 reaches 350° C., the control section 110 sends a signal to the fuel flow regulator unit 38 reducing the fuel supply flow rate, and sends a signal to the reforming airflow regulator unit 44 increasing the reforming air supply flow rate (time t4 in FIG. 7). As a result, the fuel supply flow rate is changed to 5 L/min, and the reforming air supply flow rate is changed to 18 L/min (the "POX1" state in FIG. 13). These supply quantities are appropriate supply quantities for generating a partial oxidation reaction. In other words, in the initial temperature region in which a partial oxidation reaction begins to occur, a state is formed in which fuel is reliably ignited by increasing the proportion of fuel supplied, and ignition is stabilized by maintaining that supply flow rate (the "POX1" state in FIG. 13). Moreover, after stable ignition and a rise in temperature, fuel waste is suppressed by using a fuel supply flow rate sufficient to produce a partial oxidation reaction (the "POX2" state in FIG. 13).

Next, at time t5 in FIG. 7, when the reformer 20 temperature reaches 600° C. or above and the fuel cell unit 16 temperature reaches 250° C. or above, the control section 110 sends a signal to the reforming airflow regulator unit 44 to reduce the reforming air supply flow rate, and sends a signal to the water flow regulator unit 28 serving as water supply device to start the supply of water. This results in a change in the reforming air supply flow rate to 8 L/min, and in the water supply flow rate to 2 cc/min (the "ATR1" state in FIG. 13). A steam reforming reaction is also generated in the reformer 20 by introducing water (steam) into the reformer 20. In other words, in the FIG. 13 "ATR1" state, an auto-thermal reforming (ATR) occurs in which the partial oxidation reaction and the steam reforming reaction are combined.

In the present embodiment, the temperature of the fuel cell unit 16 is measured by a generating chamber temperature sensor 142 serving as a temperature detection means disposed in the electrical generating chamber 10. The temperature inside the generating chamber and the temperature of the fuel cell units are not, precisely speaking, identical, but the temperature detected by the generating chamber temperature sensor reflects the temperature of the fuel cell unit, and the temperature of the fuel cell unit can be grasped by the temperature of the generating chamber temperature sensor inside the generating chamber. Note that in this Specification, "fuel cell unit temperature" means a temperature measured by any selected sensor indicating a value reflecting the temperature of the fuel cell unit.

Moreover, at time t6 in FIG. 7, when the temperature of the reformer 20 reaches 600° C. or above and the temperature of the fuel cell unit 16 reaches 400° C. or above, the control section 110 sends a signal to the fuel flow regulator unit 38 and reduces the fuel supply flow rate. The control section 110 also sends a signal to the reforming airflow regulator unit 44 reducing the reforming air supply flow rate, and sends a signal to the water flow regulator unit 28 increasing the water supply flow rate. By this means, the fuel supply flow rate is changed to 4 L/min, the reforming air supply flow rate is changed to 4 L/min, and the water supply flow rate is changed to 3 cc/min (the "ATR2" state in FIG. 13). Reducing the reforming air supply flow rate and increasing the water supply flow rate results in a reduction in the proportion of the partial oxidation reaction and an increase in the proportion of the steam reforming reaction in the reformer 20.

Next, at time t7 in FIG. 7, when the temperature of the reformer 20 reaches 650° C. or above, and the temperature of the fuel cell unit 16 reaches 600° C. or above, the control section 110 sends a signal to the reforming airflow regulator unit 44, stopping the supply of reforming air. The control section 110 also sends a signal to the fuel flow regulator unit 38 reducing the fuel supply flow rate, and sends a signal to the water flow regulator unit 28, increasing the water supply flow rate. The flow rate of fuel supplied is thus changed to 3 L/min, and the flow rate of water supplied is changed to 8 cc/min (the "SR1" state in FIG. 13). Because the supply of reforming air is stopped, the partial oxidation reaction ceases to occur inside the reformer 20, and SR is started, whereby only the steam reforming reaction takes place.

Moreover, at time t8 in FIG. 7, when the temperature of the reformer 20 reaches 650° C. or above and the temperature of the fuel cell unit 16 reaches 700° C. or above, the control section 110 sends a signal to the fuel flow regulator unit 38, reducing the flow rate of fuel supplied, and sends a signal to the water flow regulator unit 28, reducing the flow rate of water supplied. The control section 110 also sends a signal to the generating airflow regulator unit 45, reducing the flow rate of generating air supplied. The fuel supply flow rate is changed to the electrical generation standby supply flow rate, namely, the fuel supply flow rate is 2.3 L/min; the water supply flow rate is changed to 6.3 cc/min, and the generating air supply flow rate is changed to 80 L/min (the "SR2" state in FIG. 13).

After maintaining the supply flow rates for a predetermined electrical generation transition time, the control section 110 causes electrical power to be output from the fuel cell module 2 to the inverter 54 and begins generating electricity (time t9 in FIG. 7). After electrical generation begins, the fuel supply flow rate, generating air supply flow rate, and water supply flow rate are determined and supplied based on FIGS. 10 and 11 in accordance with the required electrical power, and a load-following operation is executed.

Note that in this embodiment, the electrical generation transition time is set at four minutes. In the example shown in FIG. 7, the fuel cell unit 16 temperature quickly rises to a temperature capable of generating electricity after transitioning to the "SR1" state, but if a predetermined initial SR continuation time elapses following transition to the "SR1" state, the control section 110 causes operation to transition to the "SR2" state even if an electrical generating temperature has not been reached. In other words, the control section 110 maintains the "SR1" state fuel supply flow rate until the temperature of the fuel cell units 16 has risen to one capable of generating electricity, or until an initial SR continuation time has elapsed. In this embodiment, the initial SR continuation time is set at 30 minutes. Moreover, the control section 110 starts the generation of electricity when a predetermined electrical generation transition time has elapsed and the temperature of the fuel cell unit 16 has risen to or above a temperature capable of generating electricity, after transition to the "SR2" state.

As described above, the flow rate of fuel supplied at a time immediately prior to the start of electrical generation (time t9) is reduced by approximately 23.3% relative to the fuel supply flow rate at the startup of the SR (time t7), in which only the steam reforming reaction occurs within the reformer 20; the water supply flow rate is reduced approximately 21.3%; and the generating air supply flow rate is reduced approximately 20%. The proportion of the fuel supply reduction is therefore greater than the proportion off the water supply reduction, and is set so as to be the most reduced of all of the supply quantities. In other words, by increasing the amount of water versus fuel, the heat of evaporation is robbed by the vaporization of water, therefore the unstable heat state at the time of startup is made calmer and more stable. By increasing the amount of water versus fuel, carbon deposition can be reliably prevented.

The fuel supply flow rate immediately prior to the start of electrical generation (time t9) is fixed at a value which is higher than the fuel supply flow rate of 1.7 L/min corresponding to the lowest output power of 200 W in the output power range, and higher than the fuel supply flow rate of 2.2 L/min corresponding to the intermediate value of 450 W in the output power range (FIG. 12). Alternatively, the fuel supply flow rate immediately prior to startup of electrical generation can be set at a value approximately the same as the fuel supply flow rate corresponding to 700 W, which is the maximum value of the output power range.

Furthermore, the electrical generation standby supply proportions of the fuel supply flow rate, generating air supply flow rate, and water supply flow rate immediately prior to the start of electrical generation (time t9) are set at approximately 1:34.8:0.0027, which differs significantly from the supply flow rate proportions for generating electricity shown in FIG. 12. Thus electrical generation standby supply proportions are set in the "SR2" state in FIG. 12 to optimize for achievement of a smooth transition from the "SR1" state in which the temperature of the fuel cell unit 16 is raised, to the electrical generating state, while inducing a steam reforming reaction. In these electrical generation standby supply proportions, the generating air supply flow rate is significantly increased relative to the supply proportions (FIG. 12) during electrical generation state. That is, with the electrical generation standby supply proportions in the present embodiment, the generating air supply flow rate is maximally reduced when electrical generation starts. By this means, excess generating air can be supplied and fuel combusted, and the fuel cell unit 16 sufficiently heated during startup processing prior to beginning the generation of electricity, while during the generation of electricity, when fuel is reduced compared to startup processing, generating air is reduced so that cooling of the fuel cell unit 16 by the generating air can be prevented.

In the solid oxide fuel cell device of the present embodiment of the invention, the flow rate of fuel supplied is reduced more in the "SR2" state immediately prior to starting electrical generation than in the "SR1" state at the beginning of the SR, therefore the amount of fuel to induce an endothermic reaction inside the reformer immediately prior to the start of electrical generation is reduced. For this reason, sudden drops in temperature of the fuel cell unit can be prevented even when the fuel supply flow rate is reduced at the startup of electrical generation, and a smooth transition from the startup state to the electrical generating state can be achieved.

Also, in the solid oxide fuel cell device of the present embodiment of the invention, the water supply flow rate at the SR immediately prior to the start of electrical generation, is reduced than the water supply flow rate at the startup of the SR, therefore in immediately prior to the start of electrical generation, the introduction of large volumes of steam into the fuel which was not spent to generate electricity, resulting in destabilization of fuel combustion, can be prevented.

Moreover, in the solid oxide fuel cell device of the present embodiment of the invention, the generating air supply flow rate is reduced more in the "SR2" state immediately prior to the start of electrical generation than in the "SR1" state at the start of SR, therefore the generating air which had been excessively supplied at SR startup in order to raise the temperature of the fuel cell unit can be appropriately set and combustion stabilized.

In the solid oxide fuel cell device of the present embodiment of the invention, the fuel supply flow rate in the "SR2" state immediately prior to the start of electrical generation is less than the fuel supply flow rate in the "SR1" state at the time of SR startup, and is greater than the fuel supply flow rate corresponding to the minimum output power, therefore an excessive drop in the temperature the fuel cell unit can be prevented, while fuel waste is suppressed prior to the start up of electrical generation, even if the required electrical power at the time of the start of electrical generation is the minimum output power.

In addition, in the solid oxide fuel cell device of the present embodiment of the invention, the fuel supply flow rate during the SR immediately prior to the startup of electrical generation is fixed, thus allowing the operating state during the startup of electrical generation to be stabilized.

In the solid oxide fuel cell device of the present embodiment of the invention, the fuel supply flow rate in the "SR2" state immediately prior to the startup of electrical generation is less than the fuel supply flow rate in the "SR1" state at the time of SR startup, and is fixed at a predetermined value greater than the fuel supply flow rate corresponding to an intermediate value of the output power range, therefore a smooth transition to the electrical generating state can be achieved while suppressing fuel waste prior to the start of electrical generation, no matter what electric power within the output power range is required at the startup of electrical generation.

Moreover, in the solid oxide fuel cell device of the present embodiment of the invention, the proportions of the fuel supply flow rate, water supply flow rate, and electrical generation oxidant gas supply flow rate in the "SR2" state immediately prior to the startup of electrical generation are optimized electrical generation standby supply proportions, which differ from the proportions of supply quantities during electrical generation, therefore a smooth transition to the electrical generating state can be achieved.

In addition, in the solid oxide fuel cell device of the present embodiment of the invention, the electrical generating standby supply proportions are set such that the generating air supply flow rate is increased by the greatest amount relative to the supply flow rate proportions during electrical generation, therefore prior to the start of electrical generation, effective heating can be performed using sufficient generating air, and after the start of electrical generation, cooling of the solid oxide fuel cell unit by air can be suppressed.

Moreover, in the solid oxide fuel cell device of the present embodiment of the invention, the electrical generation standby supply proportions are reduced to proportions at which the fuel supply flow rate is maximal relative to the supply flow rate proportions in the "SR1" state at the startup of SR, therefore the water supply flow rate increases relative to the fuel supply flow rate immediately prior to the start of electrical generation, so that heat is robbed by the heat of evaporation, and the unstable thermal state at the time of startup can be smoothly stabilized.

In the solid oxide fuel cell device of the present embodiment of the invention, reforming reactions inside the reformer proceed in the sequence POX, ATR, and SR, therefore the operation of the fuel cell module can be prevented from becoming unstable at the time of startup, and a smoother startup can be achieved.

We have discussed above a preferred embodiment of the present invention, but several variations on the above-described embodiment may also be added. In particular, in the embodiment discussed above the solid oxide fuel cell device was constituted to be able to vary output power according to the required amount of generated electricity, but the present invention could also be applied to a fuel cell device outputting a constant electrical power at all times. Also, in the embodiment discussed above, the reforming reactions within the reformer occurred in the sequence POX, ATR, and SR during startup procedure, but the ATR could, for example, be omitted. The present invention can be applied to a solid oxide fuel cell device for executing any desired startup processing to induce SR immediately prior to the start of electrical generation.

What is claimed is:

1. A solid oxide fuel cell system for generating electricity by reacting fuel and oxidation gas, comprising:
   a fuel cell module comprising multiple solid oxide fuel cell units which is thermally prepared for generation of electricity through a series of startup operations comprising an auto-thermal reforming reaction (ATR) operation and a steam reforming reaction (SR) operation performed after the ATR operation, wherein the SR operation comprises a first steam reforming reaction (SR1) operation and a second steam reforming reaction (SR2) operation performed after the SR1 and generates hydrogen by reacting the fuel with steam;
   a fuel supply device that supplies fuel used to generate electricity;
   a reformer that reforms fuel supplied from the fuel supply device and supplies the reformed fuel to the solid oxide fuel cell units, wherein the reformer is heated by burning fuel left unused for generation of electricity in the solid oxide fuel cell units;
   a water supply device that supplies water to the reformer;
   an electricity generation oxidation gas supply device that supplies oxidation gas for electricity generation to the solid oxide fuel cell units; and a controller programed to control the fuel supply device and the water supply device during the startup operations in order to thermally prepare the solid oxide fuel cell units in the fuel cell module for generation of electricity, wherein the controller is programed to control the fuel supply device to raise a temperature of the solid oxide fuel cell units during the SR 1 operation and supply the fuel to the reformer during the SR2 operation, prior to starting outputting of electricity from the solid oxide fuel cell system, at a supply rate lower than a fuel supply rate effected during the SR1 operation.

2. The solid oxide fuel cell system of claim 1, wherein the controller is programed to control the water supply device to supply water to the reformer during the SR operation, prior to starting outputting of electricity from the solid oxide fuel cell system, at a water supply rate lower than a water supply rate effected during the SR 1 operation.

3. The solid oxide fuel cell system of claim 1, wherein the controller is programed to control the electricity generation oxidation gas supply device to supply the oxidation gas to the solid oxide fuel cell units during the SR operation, prior to starting outputting of electricity from the solid oxide fuel cell system, at a gas supply rate lower than a gas supply rate effected during the SR 1 operation.

4. The solid oxide fuel cell system of claim 1, wherein the fuel cell module is operable to output electrical power which is variable in a predetermined output power range, and the controller is programed to control the fuel supply device to reduce the fuel supply rate to a predetermined fuel supply rate which is higher than a fuel supply rate necessary to generate a minimum output power of the predetermined output power range.

5. The solid oxide fuel cell system of claim 4, wherein the controller is programed to control the fuel supply device to reduce the fuel supply rate and fix the fuel supply rate to the predetermined fuel supply rate until a start of electricity generation.

6. The solid oxide fuel cell system of claim 5, wherein the predetermined fuel supply rate is greater than a fuel supply rate necessary to generate an intermediate output power in the predetermined output power range.

7. The solid oxide fuel cell system of claim 5, wherein the predetermined fuel supply rate is substantially equal to a fuel supply rate necessary to generate a maximum output power in the predetermined output power range.

8. The solid oxide fuel cell system of claim 3, wherein the controller is programed to control the fuel supply device, the water supply device, and the electricity generation oxidation gas supply device so that proportional values of supply rates of the fuel, the water and the oxidation gas relative to a total of these three supply rates effected immediately prior to starting generation of electricity are set to predetermined standby proportions which are different from proportional values of supply rates of the fuel, the water and the oxidation gas relative to a total of these three supply rates effected during generation of electricity.

9. The solid oxide fuel cell system of claim 8, wherein the proportional value of the fuel supply rate in the standby proportions is smaller than the proportional value of the fuel supply rate effected during generation of electricity.

10. The solid oxide fuel cell system of claim 9, wherein a proportional value in the standby proportions of the supply rate of the oxidation gas is greater than a proportional value of the supply rate of the oxidation gas during electricity generation.

* * * * *